(12) United States Patent
Bachl et al.

(10) Patent No.: US 7,715,349 B2
(45) Date of Patent: May 11, 2010

(54) METHOD AND APPARATUS FOR BIT MAPPING ENHANCED-DEDICATED PHYSICAL CONTROL CHANNEL (E-DPCCH) INFORMATION IN UMTS WIRELESS COMMUNICATION SYSTEM

(75) Inventors: Rainer Walter Bachl, Nuremberg (DE); Florian Derriennic, Lannion (FR); Francis Dominique, Rockaway, NJ (US); Hongwei Kong, Denville, NJ (US); Said Tatesh, Swindon (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1018 days.

(21) Appl. No.: 11/388,295

(22) Filed: Mar. 24, 2006

(65) Prior Publication Data

US 2006/0221907 A1 Oct. 5, 2006

Related U.S. Application Data

(60) Provisional application No. 60/666,052, filed on Mar. 29, 2005.

(51) Int. Cl.
*H04B 7/216* (2006.01)

(52) U.S. Cl. .......................... 370/335; 455/434; 341/3; 341/9; 370/338; 370/389; 370/473

(58) Field of Classification Search ................. 370/335, 370/389, 473, 338; 341/3, 9; 455/434
See application file for complete search history.

(56) References Cited

U.S. PATENT DOCUMENTS

| 4,047,321 A | 9/1977 | Thorning ........................ 43/78 |
| 2004/0047321 A1* | 3/2004 | Bui ............................. 370/338 |
| 2005/0078738 A1* | 4/2005 | Shieh et al. ................. 375/142 |

FOREIGN PATENT DOCUMENTS

| DE | 103 44 765 A1 | | 4/2005 |
| FR | ETSI TS 125 212 | * | 3/2005 |
| WO | PCT/US2006/01106 | | 8/2006 |

OTHER PUBLICATIONS

3GPP: "3GPP TS 25.212 V6.4.0 (Mar. 2005)", 3GPP TS 25.212, Mar. 2005, Retrieved from the Internet: URL:http://www.3gpp.org/ftp/tsg_ran/tsg_ran/TSGR_28/Docs/PDF/RP-050252.pdf>.

* cited by examiner

*Primary Examiner*—Nghi H Ly
*Assistant Examiner*—Amancio Gonzalez
(74) *Attorney, Agent, or Firm*—John Ligon

(57) ABSTRACT

In a 3GPP standards Release 6 UMTS system, in order to avoid searching at NodeB for a maximum E-DPCCH-associated metric at discrete possible valid index values, or over disjoint possible valid index regions, at the UE the three different sources of information, the fixed number bits that comprise the RSN, TFI and the H-bit components of the E-DPCCH bit field, are mapped so that the decimal equivalents of the possible E-DPCCH indices lie within a continuous range of values.

11 Claims, 2 Drawing Sheets

METHOD AND APPARATUS FOR BIT MAPPING ENHANCED-DEDICATED PHYSICAL CONTROL CHANNEL (E-DPCCH) INFORMATION IN UMTS WIRELESS COMMUNICATION SYSTEM

CROSS-REFERENCE

This application claims the benefit of U.S. Provisional Application No. 60/666052, filed Mar. 29, 2005.

TECHNICAL FIELD

This invention relates to wireless communications.

BACKGROUND OF THE INVENTION

A wireless communications network typically includes a variety of communication nodes coupled by wireless or wired connections and accessed through different types of communications channels. Each of the communication nodes includes a protocol stack that processes the data transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (e.g., a communication flow between a mobile station (MS) or User Equipment (UE), and a base station (BS) or NodeB. The dedicated physical channel may include a data part (e.g., a dedicated physical data channel (DPDCH) in accordance with UMTS Release 4/5 protocols, a fundamental channel or supplemental channel in accordance with CDMA2000 protocols, etc.) and a control part (e.g., a dedicated physical control channel (DPCCH) in accordance with UMTS Release 4/5 protocols, a pilot/power control sub-channel in accordance with CDMA2000 protocols, etc.). For UMTS, the DPDCH carries the data to be transmitted. Incoming data is in the format of transport channels and multiple transport channels are time-multiplexed into the DPDCH. Transport channels are received every Transmission Time Interval (TTI), which is 1, 2, 4 or 8 times the radio frame duration of 10 ms. Different transport channels to be multiplexed into the same DPDCH can have different TTIs, but the boundaries of the larger TTIs are always aligned with the boundaries of some smaller TTIs.

Each DPDCH frame has an associated DPCCH frame of 10 ms duration consisting of 15 slots of 10 bits each. Each slot's 10 bits consist of pilot bits and control bits. The control bits include Transport Format Combination Indicator (TFCI) bits, which provide an indicator of the data rate for each transport channel on the associated DPDCH and are used for processing the received DPDCH frame, Feed Back Information (FBI) bits, and Transmit Power Control (TPC) bits. Two bits per slot are allocated for TFCI. The actual combination of numbers of the remaining 8 bits can changed and is controlled by the Radio Network Controller (RNC). An exemplary configuration is 5 pilot bits, 2 TFCI bits, 1 FBI bit and 2 TPC bits for one slot. Both the NodeB and the UE know the pilot bits, but the rest of the bits are unknown to the NodeB.

TFCI is transmitted every frame by the UE. It is a 10-bit word that is coded into a 32-bit TFCI codeword. In a normal mode, two coded bits are punctured and the remaining 30 TFCI coded bits are transmitted in a radio frame, 2 bits per slot, 15 slots per radio frame. Since TFCI is a 10-bit word, there are 1024 possible TFCI index values. Depending, however, on the Transport Format Combination Set (TFCS) size, only the indices from 0 to TFCS_size−1 are used out of those 1024 possible TFCI index values, where the number TFCS_size is much smaller than 1024. For each transmission, the index is mapped to its 10-bit binary representation, which is $(x10, x9, \ldots, x1)$, where bit $x10$ is the MSB and bit $x1$ is the LSB, and where this binary representation of TFCI runs from 0 to TFCS_size−1. This 10-bit word is then encoded by a (32, 10) subcode of a $2^{nd}$ order Reed-Muller code to produce the 32-bit TFCI codeword $(z0, z1, \ldots, z31)$, which is punctured by not transmitting the last two bits, $z30$ and $z31$. As noted, these remaining 30 bits, $z0, \ldots, z29$, are transmitted 2-bit per slot in the 15-slot DPCCH frame.

At the NodeB receiver, soft symbols, $s0, s1, \ldots, s31$ corresponding to the coded TFCI bits $z0, z1, \ldots, z31$ at the UE are derived. These soft symbols are decoded by correlating them with each of the 1024 possible TFCI code words to obtain 1024 metrics for TFCS indexes $\{0, 1, \ldots, 1023\}$. A search for the maximum of these metrics is performed and the index that corresponds to the maximum metric is the decoded TFCI. Fast Hadamard Transform (FHT) can be employed as a computationally efficient method to perform the correlation. Since the NodeB knows the TFCS look-up table size in use, it only needs to search on the metrics corresponding to the indices from 0 to TFCS-size−1, with no gaps in between these indices. This gives significant performance advantage over the case when no information about the actual size of TFCS is assumed (i.e., TFCS-size=1024), especially when the actual TFCS size is much smaller than 1024. The maximum search is thus able to operate only on the metrics for the first TFCS_size indices out of the possible 1024 indices.

Newer versions of these standards, for example, Release 6 of UMTS provide for high data rate uplink channels referred to as enhanced dedicated physical channels. These enhanced dedicated physical channels may include an enhanced data part (e.g., an enhanced dedicated physical data channel [E-DPDCH] in accordance with UMTS protocols) and an enhanced control part (e.g., an enhanced dedicated physical control channel [E-DPCCH] in accordance with UMTS protocols). As defined in the specification of the enhanced uplink data channel, the UE transmits a frame of data in the E-DPDCH simultaneously with a frame of control information in the E-DPCCH channel. This control information that is communicated from UE to NodeB includes parameters that are in general needed by the NodeB to decode the E-DPDCH frame. An E-DPCCH word includes seven E-TFI (E-DCH [enhanced-uplink dedicated channel] Transport Format Indicator) bits that provide the NodeB with information from which the NodeB can determine the actual packet size within the E-DPDCH data frame. This is needed because the transport channels can have a variable packet data size based on the type of the applications and the dynamic nature of packet data communication. Generally, two frame sizes (TTI lengths), i.e., 10 ms and 2 ms, are available for use in the E-DPDCH. In addition, an E-DPCCH word includes RSN (retransmission sequence number) bits that indicate the redundancy version of the data frame on the E-DPDCH, up to a maximum of 3, which can be represented by two bits. The redundancy version is needed because the NodeB needs to know whether a frame is transmitted for the first time, or is a HARQ (Hybrid Automatic Repeat Request) first, second or third retransmission of the data frame. If a previous transmission has not been acknowledged by any of the NodeBs that might be communicating with a UE, the UE will retransmit the same frame unless an acknowledgement (ACK) is received from at least one NodeB, or the maximum allowable number of retransmissions of the same frame has been reached. Therefore, even if a NodeB was not previously able to decode a frame transmission, it cannot predict whether the UE will send a new transmission of another frame or the retransmission of the previous frame since another NodeB with which the UE was communicating might have acknowledged the previous frame. The E-DPCCH word also includes a single happy bit (H-bit), which the UE uses to inform the NodeB whether or not it is happy with current setup of E-DCH channels (e.g., the UE can use this indictor to tell the NodeB that it needs more data capacity and can handle it, but NodeB currently is not allowing it to have the data rate so it is not happy). An E-DPCCH word thus contains 10-bits that are the seven TFI bits, the two RSN bits and the single happy bit (H-bit) within one frame of transmission.

In accordance with 3GPP standards Release 6 (TS25.212, version 6.4.0, Mar. 30, 2005), these three sources of information (RSN, TFI and H-bit) are used to form a 10-bit E-DPCCH word ($x10, x9, \ldots, x1$). FIG. 1 shows the mapping of the RSN, TFI and H-bit bit mapping by bit mapper 101 at the UE 102 of the two RSN bits into bits ($x1, x2$), TFI into bits ($x3, \ldots, x9$) and the H-bit into bit $x10$. Coder 103 then encodes the 10-bit DPCCH words using a (32,10) subcode of a $2^{nd}$ order Reed-Muller code to form a 32-bit E-DPCCH codeword ($z0, z1, \ldots, z31$), which is the same as the encoding of the TFCI for DPCCH described above. As for TFCI for DPCCH, only the first 30 bits, $z0, \ldots, z29$, are transmitted. At the NodeB receiver 104, the soft symbols ($s0, s1, \ldots, s31$) corresponding to the coded E-DPCCH bits, ($z0, z1, \ldots, z31$) at the UE 102, are derived (not shown). Correlator 105 correlates these soft symbols with each possible E-DPCCH code words (1024 in total), to produce the 1024 metrics of E-DPCCH indices $\{0,1,\ldots,1023\}$. As for DPCCH, FHT can be employed as a computationally efficient method to perform the correlation. Since NodeB can exploit prior knowledge about the maximum RSN and the Transport Format Set (TFS) size in use, searcher 106 only needs to perform the search on those metrics that correspond to valid E-DPCCH words. However, the valid E-DPCCH words do not correspond to a single range of indices but rather correspond to either discrete indices or to a few disjoint index regions. Hence, the maximum search by searcher 106 over metrics with valid E-DPCCH indices is more involved than the corresponding search over TFCIs over $\{0, 1, \text{TFCS-size}-1\}$ for DPCCH described above. As a first example, if the maximum RSN is 1, and TFI has values from 0-3, there are 16 valid indices having discrete values of 0, 2, 128, 130, 256, 258, 384, 386, 512, 514, 640, 642, 768, 770, 896, and 898. As a second example, if the maximum RSN is 3 and TFI has values from 0-3, there are a total of 32 valid indices having values in the individual ranges of 0-3, 128-131, 256-259, 384-387, 512-515, 640-643, 768-771, and 896-899, thus requiring a search for the maximum metric over eight disjoint index regions.

SUMMARY OF THE INVENTION

In order to avoid searching for a maximum metric at discrete possible valid index values, or over disjoint possible valid index regions, the three different sources of information, the fixed number bits that comprise the RSN, TFI and the H-bit components of the E-DPCCH bit field, are mapped so that the decimal equivalents of the possible E-DPCCH indices lie within a continuous range of values. Advantageously, with such mapping, the legacy TFCI decoder at the NodeB that is used for DPCCH can be reused for E-DPCCH.

DETAILED DESCRIPTION

Figure 1:
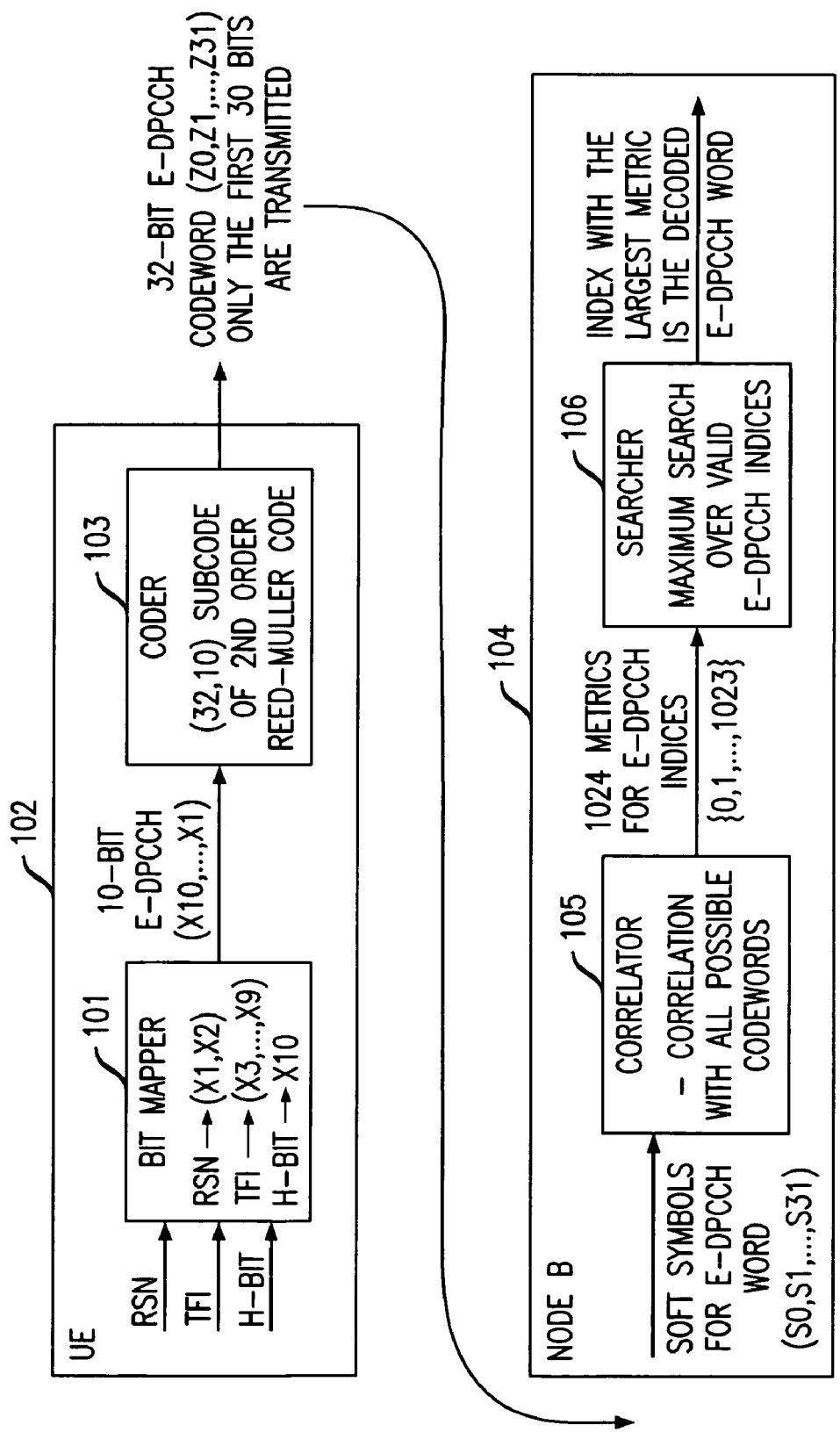
FIG. 1 is high-level block diagram showing the prior art E-DPCCH processing at the UE and at the NodeB.

In accordance with the described embodiment of the present invention, rather than mapping the three sources of information (RSN, TFI and H-bit) separately into the E-DPCCH 10-bit field as per the prior art as described above and illustrated in FIG. 1, these three information sources are instead bit-mapped so that the decimal equivalents all possible RSN, TFI and H-bit combinations lie within a continuous range of values. Thus, the search for a maximum metric amongst the correlated received soft symbol word and possible code words can be efficiently searched only a continuous range of possible indices and the legacy TFCI coder that is used at NodeB for DPCCH can be re-used for this purpose.

Specifically, the following mapping of the H-bit, RSN and TFI achieves the desired functionality:

$$\text{10-bit } E\text{-}DPCCH \text{ in decimal} = (H\text{-bit}) + (\text{\# of possible values of } H\text{-bit}) * RSN + (\text{\# of possible values of } H\text{-bit}) * (\text{\# of possible values of } RSN) * TFI \quad (1)$$

In equation (1), the "# (number) of possible values of the H-bit" is 2 since the H-bit can be 0 or 1, and the "# of possible values of RSN" is equal to MAX_RSN+1 since RSN can take any value from the following sets: $\{0\}, \{0,1\}, \{0,1,2\}$, and $\{0,1,2,3\}$. MAX_RSN+1 is thus the size of the set of possible values of RSN and can be 1, 2, 3 or 4. TFI is the transport format index in decimal, and being 7 bits, can range in decimal value between 0 and 127. Equation (1) can be written as:

$$\text{10-bit } E\text{-}DPCCH \text{ in decimal} = (H\text{-bit}) + 2*RSN + 2*(MAX\_RSN+1)*TFI \quad (2)$$

The maximum value of the E-DPCCCH word is therefore:

$$MAX\_E\text{-}DPCCH\_\text{index} = 1 + 2*MAX\_RSN + 2*(MAX\_RSN+1)*MAX\_TFI \quad (3)$$

where MAX_TFI is the maximum TFI (in decimal) currently in use.

Figures 2, 3:
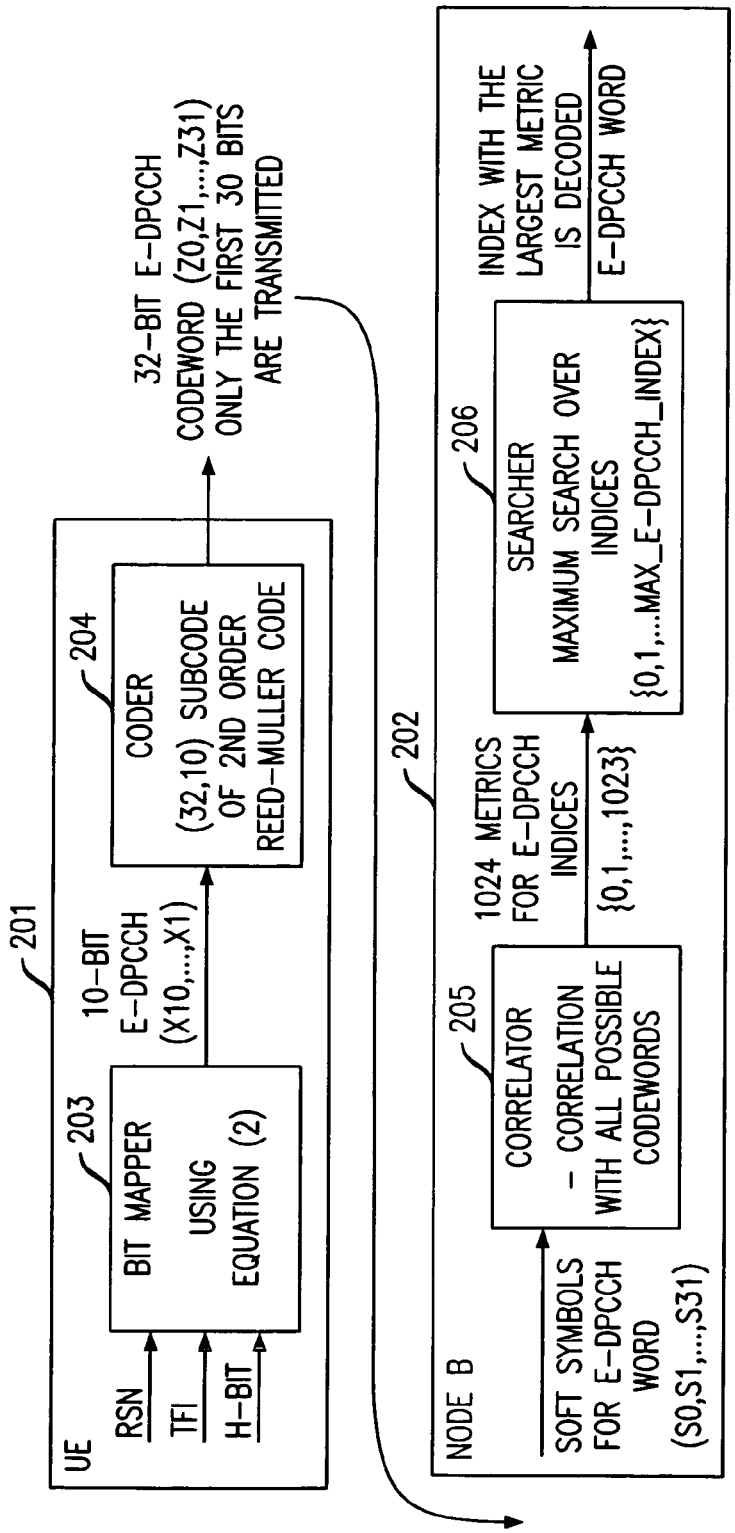
FIG. 2 is a high-level block diagram showing the E-DPCCH processing at the UE and at the NodeB in accordance with an embodiment of the present invention.
FIG. 3 shows the mapping of the H-bit, the RSN and TFI bits for a particular exemplary embodiment.

FIG. 2 shows the processing of E-DPCCH at the UE 201 transmitter and the NodeB 202 receiver. At UE 201, bit mapper 203 maps the input RSN, TFI and H-bit according to equation (2) above to produce a 10-bit E-DPCCH word ($x10, x9, \ldots, x1$), where bit $x10$ is the MSB and bit $x1$ is the LSB. Coder 204 then encodes the 10-bit E-DPCCH word using a (32,10) subcode of a $2^{nd}$ order Reed-Muller code to form a 32-bit E-DPCCH codeword ($z0, z1, \ldots, z31$), in the same manner as coder 103 did in FIG. 1. As described above, only the first 30 bits, $z0, \ldots, z29$, are transmitted. At the NodeB receiver 202, the soft symbols ($s0, s1, \ldots, s31$) corresponding to the coded E-DPCCH bits, ($z0, z1, \ldots, z31$) at the UE 102, are derived (not shown). Correlator 205 correlates these soft symbols with each possible E-DPCCH code word (1024 in total), to produce the 1024 metrics of E-DPCCH indices $\{0, 1, \ldots, 1023\}$. As previously discussed, FHT can be employed as a computationally efficient method to perform the correlation. Since the valid indices now only range between 0 and MAX_E-DPCCH_index, searcher 206 needs only conduct a maximum search over the indices {0,1, . . . , MAX_E-DPCCH_index} to determine the index having the largest metric and thus the decoded E-DPCCH word. Advantageously, a complete reuse of the legacy TFCI decoder at NodeB is achieved.

As an example, if MAX_RSN=3 (i.e., RSN is from the set {0, 1, 2, 3}, equation (2) becomes:

10-bit $E\text{-}DPCCH$ in decimal=$(H\text{-bit})+2*RSN+8*TFI$ (4)

The multiplication by 2 of the 2 RSN bits is equivalent to bit-shifting RSN to the left by one bit and the multiplication by 8 of the 7 TFI bits is equivalent to bit-shifting TFI to the left by 3 bits. This results in the following simple mapping of the RSN, TFI and H bit by bit mapper 203 as follows:

$x10=x_{tfi,1}$ (5)

$x9=x_{tfi,2}$ (6)

$x8=x_{tfi,3}$ (7)

$x7=x_{tfi,4}$ (8)

$x6=x_{tfi,5}$ (9)

$x5=x_{tfi,6}$ (10)

$x4=x_{tfi,7}$ (11)

$x3=x_{rsn,1}$ (12)

$x2=x_{rsn,2}$ (13)

$x1=x_{h,1}$ (14)

where (x10, x9, . . . , x1) is the 10-bit E-DPCCH codeword from MSB (x10) to LSB (x1), where $x_{h,1}$ is the H-bit, $x_{rsn,1}$ and $x_{rsn,2}$ represent the RSN, with $x_{rsn,1}$ the MSB and $x_{rsn,2}$ the LSB. TFI is represented by a 7-bit integer, with $x_{tfci,1}$ the MSB and $x_{tfci,7}$ the LSB. FIG. 3 shows the bit mapping of the H-bit, the RSN bits and the TFI bits into a 10-bit E-DPCCH word, which can vary in decimal value, using equation (3), from 0 (H-bit=0, RSN=0, TFI=0) to a maximum value of (7+8*MAX_TFI).

As compared with the prior art example described above that resulted in 32 valid indices in 8 disjoint index ranges when the maximum RSN is 3 and TFI has values from 0-3, using the mapping of equation (4) results in 32 possible E-DPCCH words that continuously range from a minimum '0000000000', or decimal "0" when H, TFI and RSN are all zeroes, to a maximum '0000011111', or decimal "31" when H='1' (decimal 1), TFI='0000011' (decimal "3"), and RSN='11' (decimal "3").

For the other prior art example described above, where if the maximum RSN is 1 and TFI has values from 0-3, equation (2) becomes:

10-bit $E\text{-}DPCCH$ in decimal=$(H\text{-bit})+2*RSN+4*TFI$ (15)

In this case, rather than 16 discrete and disjoint valid indices that the prior art methodology yields, using the mapping of equation (15) yields 16 possible valid E-DPCCH words than continuously range from a minimum of '0000000000", or decimal "0", when H, RSN and TFI all are zeroes, to a maximum of '0000001111', or decimal "15", when H=1, RSN=1, and TFI=3.

Although described in the connection with a UMT embodiment, the present invention can be employed in any other wireless embodiment to bit map a plurality of fixed-bit-length information components that each have individual maximum possible decimal-equivalent values into a single control word that, depending on the values of the information components, has possible decimal equivalent values that continuously range from a minimum to maximum.

The above-described embodiments are illustrative of the principles of the present invention. Those skilled in the art could devise other embodiments without departing from the spirit and scope of the present invention.

The invention claimed is:

1. A method at a transmitter in a wireless communications system having a control channel operable to communicate a fixed-length Happy (H) indicator, a fixed-length Retransmission Sequence Number (RSN), and a fixed-length Transport Format Indicator (TFI), the method being for combining the H indicator, the RSN and the TFI into a combined fixed-length multi-bit codeword for transmission in a frame on a control channel, the method comprising:

mapping the fixed number of bits of the Happy indicator, the fixed number of bits of the RSN, and the fixed number of bits of the TFI into a combined fixed-length multi-bit codeword such that the decimal equivalents of the combined codewords formed from all allowed combinations of the Happy indicator, the RSN and TFI lie within a continuous range of values, the number of allowed combinations of the Happy indicator, the RSN, and TEI being less than the maximum number of different values in decimal that the combined fixed-length multi-bit codeword could possibly have.

2. The method of claim 1 wherein the control channel is an Enhanced Dedicated Physical Control Channel (E-DPCCH) transmitted by user equipment, the Happy indicator is a single Happy (H) bit, the RSN has a fixed-length of two bits, the TFI has a fixed-length of seven bits, and the combined fixed-length multi-bit codeword has ten bits.

3. The method of claim 2 wherein the H-bit, the two RSN bits and the TFI bits are mapped to the combined 10-bit codeword that in decimal is equal to:

($H$-bit)+(# [number] of possible values of $H$-bit)
*$RSN$+(# of possible values of $H$-bit)*(# of possible values of $RSN$)*$TFI$.

4. The method of claim 3 where "# of possible values of the H-bit" is two, and the "# of possible values of RSN" is equal to MAX_RNS+1, and the combined 10-bit codeword in decimal is equal to ($H$-bit)+2*$RSN$+2*($MAX\_RSN$+1)*$TFI$, and the maximum value in decimal of the combined 10-bit codeword is equal to:

1+2*$MAX\_RSN$+2*($MAX\_RSN$+1)*$MAX\_TFI$ where MAX_TFI is the maximum TFI, in decimal, being used.

5. The method of claim 4 where if MAX_RSN is equal to three, then the mapping of the H-bit, the two RSN bits and the seven TFI bits is:

$x10=x_{tfi,1}$ $x9=x_{tfi,2}$ $x8=x_{tfi,3}$ $x7=x_{tfi,4}$ $x6=x_{tfi,5}$ $x5=x_{tfi,6}$ $x4=x_{tfi,7}$ $x3=x_{rsn,1}$ $x2=x_{rsn,2}$ $x1=x_{h,1}$ where (x10, x9, . . . , x1) is the combined 10-bit codeword from most significant bit (MSB) (x10) to least significant bit (LSB) (x1), where $x_{h,1}$ is the H-bit, $x_{rsn,1}$ and $x_{rsn,2}$ are the two RSN bits, with $x_{rsn,1}$ the MSB and $x_{rsn,2}$ the LSB, and with $x_{tfci,1}$-$x_{tfci,7}$ being the seven TFI bits from MSB to LSB.

6. Apparatus at a transmitter in a wireless communications system, the wireless communications system having a control channel operable to communicate a fixed-length Happy indicator, a fixed-length Retransmission Sequence Number (RSN), and a fixed-length Transport Format Indicator (TFI), the apparatus operating to combine the H indicator, the RSN and the TFI into a combined fixed-length multi-bit codeword for transmission in a frame on a control channel, the apparatus comprising:
   means for receiving the Happy indicator, the RSN and the TFI; and
   means for mapping the fixed number of bits of the Happy indicator, the fixed number of bits of the RSN, and the fixed number of bits of the TEI into a combined fixed-length multi-bit codeword such that the decimal equivalents of the combined codewords formed from all allowed combinations of the Happy indicator, the RSN and TFI lie within a continuous range of values, the number of allowed combinations of the Happy indicator, the RSN, and TEI being less than the maximum number of different values in decimal that the combined fixed-length multi-bit codeword could possibly have.

7. The apparatus of claim 6 wherein the transmitter is in user equipment, the control channel is an Enhanced Dedicated Physical Control Channel (E-DPCCH) transmitted by the user equipment, the Happy indicator is a single Happy (H) bit, the RSN has a fixed-length of two bits, the TFI has a fixed-length of seven bits, and the combined fixed-length multi-bit codeword has ten bits.

8. The apparatus of claim 7 wherein the means for mapping maps the H-bit, the two RSN bits and the TFI bits to the combined 10-bit codeword that in decimal is equal to:

(*H*-bit)+(# [number] of possible values of *H*-bit)
    *RSN+(# of possible values of *H*-bit)*(# of possible values of *RSN*)**TFI*.

9. The apparatus of claim 8 where "# of possible values of the H-bit" is two, and the "# of possible values of RSN" is equal to MAX_RNS+1, and the combined 10-bit codeword in decimal is equal to (*H*-bit)+2**RSN*+2*(*MAX_RSN*+1)**TFI*, and the maximum value in decimal of the combined 10-bit codeword is equal to:

1+2**MAX_RNS*+2*(*MAX_RSN*+1)**MAX_TFI* where MAX_TFI is the maximum TFI, in decimal, being used.

10. The apparatus of claim 9 where if MAX_RSN is equal to three, then the mapping of the H-bit, the two RSN bits and the seven TFI bits is:

$x10=x_{tfi,1}$ $x9=x_{tfi,2}$ $x8=x_{tfi,3}$ $x7=x_{tfi,4}$ $x6=x_{tfi,5}$ $x5=x_{tfi,6}$ $x4=x_{tfi,7}$ $x3=x_{rsn,1}$ $x2=x_{rsn,2}$ $x1=x_{h,1}$ where (x10, x9, . . . , x1) is the combined 10-bit codeword from most significant bit (MSB) (x10) to least significant bit (LSB) (x1), where $x_{h,1}$ is the H-bit, $x_{rsn,1}$ and $x_{rsn,2}$ are the two RSN bits, with $x_{rsn,1}$ the MSB and $x_{rsn,2}$ the LSB, and with $x_{tfci,1}$-$x_{tfci,7}$ being the seven TFI bits from MSB to LSB.

11. A method at a transmitter in a wireless communications system having a control channel operable to communicate a fixed-length Happy (H) indicator, a fixed-length Retransmission Sequence Number (RSN), and a fixed-length Transport Format Indicator (TFI), the method being for combining the H indicator, the RSN and the TFI into a combined fixed-length multi-bit codeword for transmission on the control channel, the method CHARACTERIZED BY:
   mapping bits of the Happy indicator, bits of the RSN, and bits of the TFI into a combined 10-bit codeword, wherein the Happy indicator is a single Happy bit, the RSN has a fixed-length of two bits, the TFI has a fixed-length of seven bits, and the mapping of the H-bit, the two RSN bits and the seven TFI bits is:

$x10=_{tfi,1}$ $x9=_{tfi,2}$ $x8=_{tfi,3}$ $x7=_{tfi,4}$ $x6=_{tfi,5}$ $x5=_{tfi,6}$ $x4=_{tfi,7}$ $x3=_{rsn,1}$ $x2=_{rsn,2}$ $x1=_{h,1}$ where (x10, x9, . . . , x1) is the combined 10-bit codeword from most significant bit (MSB) (x10) to least significant bit (LSB) (x1), where $X_{h,1}$ is the H-bit, $X_{rsn,1}$ and $X_{rsn,2}$ are the two RSN bits, with $X_{rsn,1}$ the MSB and $X_{rsn,2}$ the LSB, and with $x_{tfi,1}$-$X_{tfi,7}$ being the seven TFI bits from MSB to LSB.

* * * * *